United States Patent [19]
Hansen

[11] Patent Number: 5,535,009
[45] Date of Patent: Jul. 9, 1996

[54] COPIER/PRINTER OPERATING WITH INTERRUPTS

[75] Inventor: David R. Hansen, Honeoye Falls, N.Y.

[73] Assignee: Eastman Kodak Company, Rochester, N.Y.

[21] Appl. No.: 174,106

[22] Filed: Dec. 28, 1993

[51] Int. Cl.$^6$ ............................ H04N 1/21; H04N 1/23; G03G 21/00
[52] U.S. Cl. ........................ 358/296; 358/401; 355/313
[58] Field of Search .................................. 358/296, 401, 358/444, 468; 355/313, 314; 395/115, 734–42, 867, 868

[56] References Cited

U.S. PATENT DOCUMENTS

| 4,712,906 | 12/1987 | Bothner et al. | |
| 4,947,345 | 8/1990 | Paradise et al. | 364/519 |
| 5,079,723 | 1/1992 | Herceg et al. | 395/156 |
| 5,105,283 | 4/1992 | Forest et al. | |
| 5,152,001 | 9/1992 | Hanamoto. | |
| 5,164,842 | 11/1992 | Gauronski et al. | 358/401 |
| 5,206,735 | 4/1993 | Gauronski et al. | 358/296 |
| 5,361,134 | 11/1994 | Hu et al. | 358/295 |

FOREIGN PATENT DOCUMENTS

| 0579288A2 | 6/1990 | European Pat. Off. |
| 0478355A2 | 9/1991 | European Pat. Off. |
| WO90/07753 | 7/1990 | WIPO. |

Primary Examiner—Peter S. Wong
Assistant Examiner—Gregory J. Toatley, Jr.
Attorney, Agent, or Firm—Norman Rushefsky

[57] ABSTRACT

A copier and/or printer apparatus that supports plural interrupts. When a job is tagged as an interrupt job, the queueing of jobs switches from FIFO to LIFO in order to process the interrupt job as soon as prescribed. Another job may interrupt the first interrupt job still adhering to the LIFO operation making it the active job as soon as prescribed. When this second interrupt job is completed, the first interrupt job resumes. When the first interrupt job is completed, the job that was interrupted resumes. The original job that was interrupted may have been the first-out job of a FIFO job queue. Interrupting an interrupt is thus possible in an electronic copier and/or printer. The limiting factor is the maximum number of jobs that memory space has been allocated for on power-up of the machine. There thus may be supported interrupting a "normal" job, interrupting a queue of "normal" jobs, proofing a page, and proofing a page within an interrupt job (2 levels of interrupt). With the apparatus configured as a copier/printer, the machine thus supports interrupting a print job with a copy job, interrupting a copy job that interrupted a print job (2 levels of interrupt) and proofing a page within a job that interrupted a copy job that interrupted a print job (3 levels of interrupt).

16 Claims, 4 Drawing Sheets

COPIER/PRINTER OPERATING WITH INTERRUPTS

BACKGROUND OF THE INVENTION

1. Field of the Invention

This invention relates generally to electronic reproduction apparatus operable in copier and/or printer modes and more particularly to a copier and/or printer having an interrupt operation wherein plural interrupt jobs may be nested or stacked.

2. Background Art

In U.S. Pat. No. 5,105,283, description is provided of an electrophotographic reproduction apparatus that is operable in both copier and printer modes. As used herein, the term "copier" is meant to refer to apparatus arranged for reading the image information on an original document sheet and for reproducing such image information on a receiver or copy sheet, which is a "hard copy." The term "printer" is meant to refer to apparatus arranged for receiving image information in other than hard copy form, referred to as electronic form, and for reproducing such image information on a receiver sheet. The term "original" is meant to refer to image information to be reproduced, whether such image information is in hard copy, electronic or other form. The term "reproduction apparatus" is meant to refer to copiers and/or printers. The term "print job" is used in its conventional sense and implies operation of the apparatus in a printer mode to produce one or more hard copy sets from a production job requesting printing of data in accordance with predetermined parameters requested for producing said copy sets. The data may represent one or more pages of data. The term "copy job" is used in its conventional sense and implies operation of the apparatus in a copier mode to produce one or more hard copy sets from a production job requiring copying of an original document having one or more hard copy pages in accordance with predetermined parameters requested for producing said copy sets.

A typical job represents a request to either print or copy a page or a sequence of pages. Where it represents a sequence of pages, the pages will be collated as a group or output finished such as by stapling.

In known copier/printer reproduction apparatus, a problem is associated with management of the copier and printer functions since only one marking engine is available for reproducing the information on the copy sheets. More specifically, a job image buffer memory is available as an interface to a writer for storing in rasterized form the information to be printed or copied. The buffer may, for example, have a capacity for storing image data for printing or copying about 50 pages. In order to speed reproduction of the jobs, it is conventional to store plural jobs in the memory and print them out, one by one. It is known to allow for interruption of a print job or copier in progress to allow access to the apparatus for reproduction of one or more other copy or print jobs.

From U.S. Pat. No. 5,206,735, it is known to provide in an electronic copier having an electronic job queue of copier jobs awaiting printing an interrupt system wherein interrupt jobs to be processed are inserted into a print queue at selected locations in a job file succession that is suitable for printing the interrupt jobs at an earliest logical point and interrupting the print job currently being printed when the printer detects the interrupt job. For example, stopping the current production job may occur at the end of a set in process for a collated production job. Where the current production job is uncollated, stopping occurs when the last print of the page being printed is made.

When processing plural interrupts, the prior art notes that more recent interrupt jobs are restricted such that they are placed in the print queue immediately after the previously programmed interrupt job. Interrupt jobs are then handled on a first-in first-out (FIFO) basis and cannot be reordered.

The inventor has recognized that a copier and/or printer reproduction apparatus having a first-in, first-out hierarchy for nesting of interrupts provides an unforeseen restriction on the available features for reproduction.

It is therefore an objective of the invention to provide a copier and/or printer apparatus with improved handling of plural interrupts.

SUMMARY OF THE INVENTION

In accordance with one aspect of the invention there is provided reproduction apparatus comprising memory means for storing a plurality of production jobs for printing; interrupt means for designating a plurality of production jobs to be stored in said memory means as interrupt jobs; control means for controlling printing of normal production jobs in a first-in-first-out basis and for controlling printing of jobs designated as interrupt jobs so as to be printed on a last-in-first-out basis wherein a first interrupt job interrupts a current normal job and a second interrupt interrupts the first interrupt job; and printing means responsive to the control means for forming prints of the plurality of normal production jobs and the interrupt jobs whereby later in time interrupt jobs interrupt earlier in time interrupt jobs and a first later-in-time interrupt job interrupts an earlier-in-time "normal" production job.

In accordance with another aspect of the invention, there is provided a method for electronically producing copies comprising storing a plurality of production jobs for printing in a memory; designating a plurality of production jobs to stored in said memory as interrupt jobs; and controlling printing of normal production jobs in a first-in-first-out basis and controlling printing of jobs designated as interrupt jobs so as to be printed on a last-in-first-out basis wherein a first interrupt job interrupts a current normal job and a second interrupt interrupts the first interrupt job; and forming prints of the plurality of normal production jobs and the interrupt jobs whereby later in time interrupt jobs interrupt earlier in time interrupt jobs and a first later-in-time interrupt job interrupts an earlier-in-time "normal" production job.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

The present description will be directed in particular to elements forming part of, or cooperating more directly with, apparatus in accordance with the present invention. It is to be understood that elements not specifically shown or described may take various forms well known to those skilled in the art.

Figure 1:
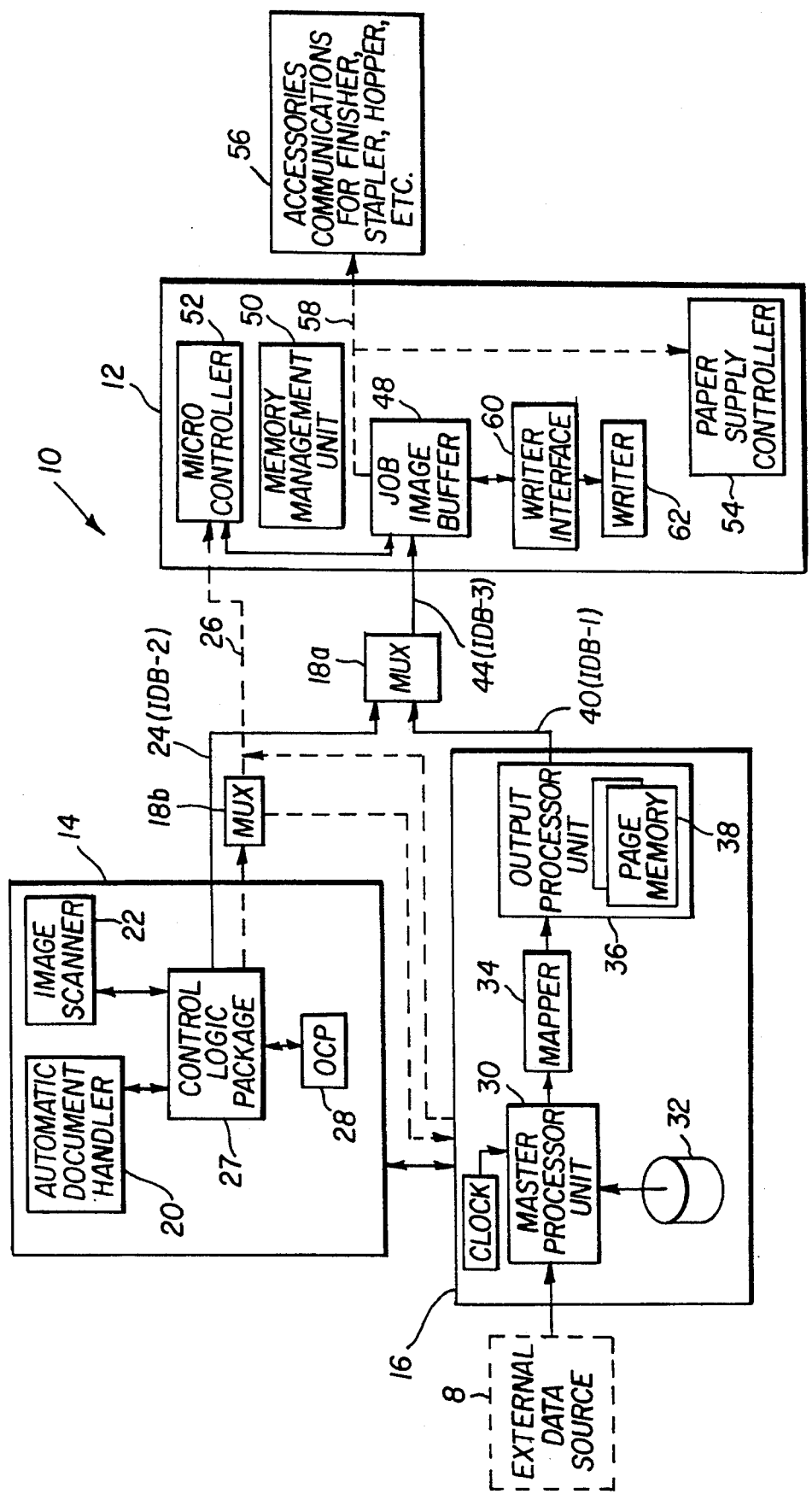
FIG. 1 is a schematic block diagram of one embodiment of copier/printer reproduction apparatus programmed in accordance with the invention.
Figure 2:
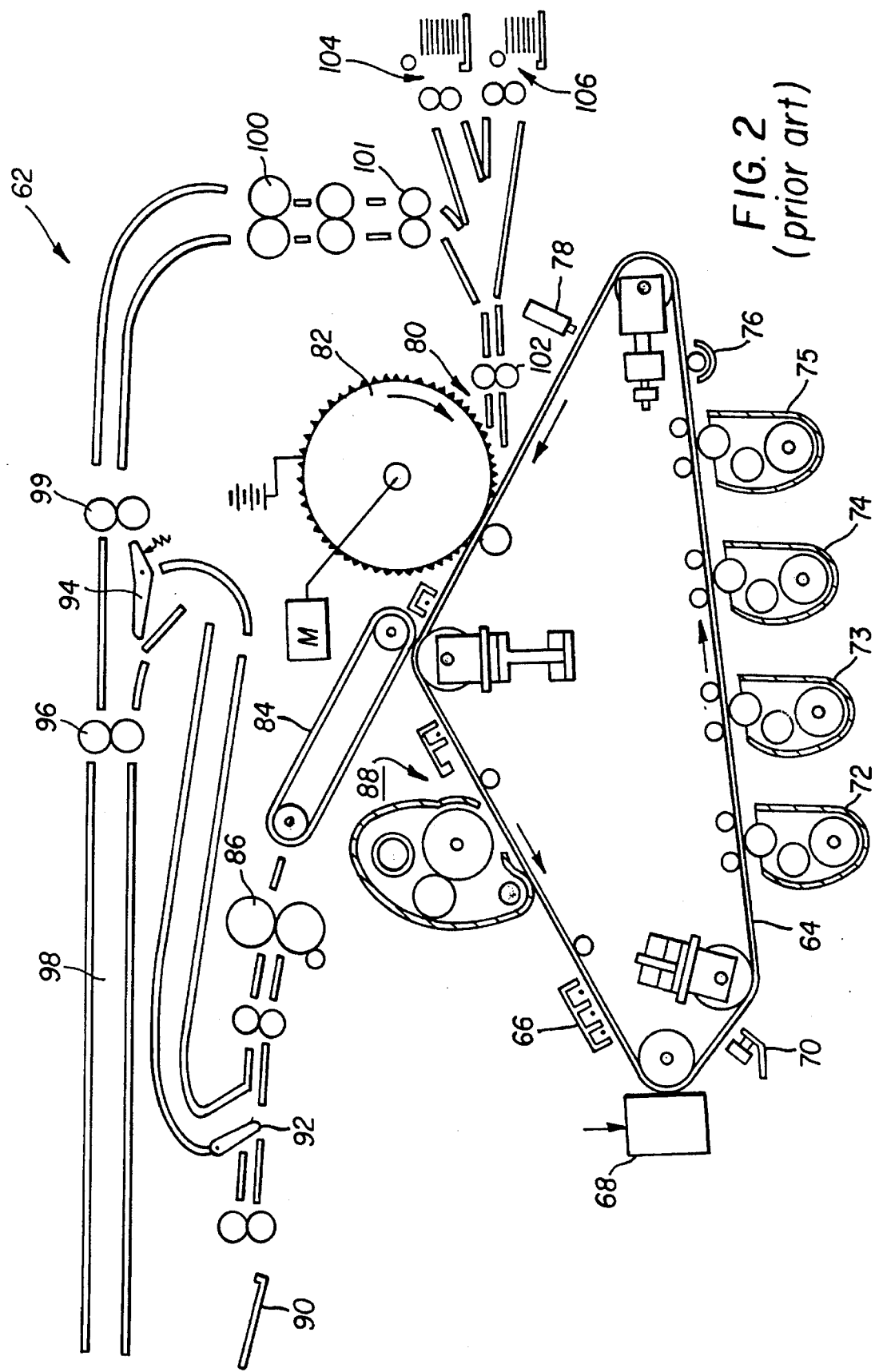
FIG. 2 is a diagram of a multi-color electrostatographic writer of the prior art but forming a part of the apparatus of the invention.

According to FIGS. 1 and 2, copier/printer reproduction apparatus 10 includes a marking engine 12, a scanner 14, a raster image processor (RIP) 16, and multiplexers 18a and 18b, for selecting or multiplexing respective inputs to the marking engine 12.

An original document reader such as scanner 14 is arranged for producing a series of electrical signals representative of the image content of original document sheets. Scanner 14 consists of an automatic document handler 20 for stream feeding in serial fashion hard copy original pages to a platen or scanning station to be automatically read by an image scanner 22 such as a linear array of solid state charge-coupled devices. In lieu of feeding document sheets to the platen, documents such as books or sheets may be placed on the platen. The solid state device scans the original pages, converting their images to a series of electrical signals in page format for input to a buffer memory forming part of the image scanner 22. In response to a signal from the RIP 16 to the multiplexer 18a, the image data and signals identifying separate scan lines are transmitted along an image data bus 24 (IDB-2) to the marking engine 12 via multiplexer 18a. Signals representing coded messages and providing page information and other marking engine control information identifying requirements for the job are transmitted along a job control communications link 26 to the marking engine 12. When the RIP 16 is operative, a multiplexer 18b causes these messages to be sent to the RIP and then from the RIP to the marking engine. When the RIP is non-operating, messages form the scanner are sent via the multiplexer 18b directly to the marking engine 12.

Scanner 14 includes a control logic package 27 having an operator control panel (OCP) 28 for the operator to input functions using keys and a display to allow the operator to receive messages from the reproduction apparatus. Setup instructions for a copy job are input by the operator using the OCP and interpreted by the control logic package which then sends coded messages via link 26 for finishing and processing to the marking engine 12. The logic package consists of control software, interface software and logic and computer hardware including memory. Functions inputted by the operator at the control panel provide for operation of the apparatus in various copying modes well known in the prior art to perform various copying jobs in accordance with the inputted parameters for each copy job. Such functions might include simplex or duplex copying, magnification or reduction, number of copies, image editing, etc. In the copier mode, the copier/printer functions as a conventional electronic copier and jobs are scanned in the scanner 14 using a feeder to circulate same and generate a rasterized signal of the image information on the documents. The scanned image data is stored in a page buffer that forms a part of image scanner 22 and upon connection of image data bus-2 (24) to image data bus-3 (44) by multiplexer 18a the image data is transferred to JIB 48. Also transferred to the microcontroller 52 or job control queue (JCQ) are job control data. In JIB 48, the scanned image information data is compressed, stored in the JIB's memory and then expanded when the frame to be printed is in a position synchronized with the data for sending the data to writer 62 for recording same on the charged photoconductive web 64 by selectively enabling LEDs on an LED printhead. Further details relative to the JIB are described in international published application WO 90/07753, the contents of which are incorporated herein by this reference.

Raster image processor 16 includes a master processor unit 30 which receives high level commands and data in character code or other form from an external electronic data source 8 which may be one or more of a main frame computer, network link, data processing work station, facsimile receiver, removable memory media, or the like. The commands are translated into machine control language by the master processing unit 30. A job buffer 32 stores incoming jobs and program codes for use by the master processing unit.

After interpreting a job, master processing unit 30 parcels the job to a mapper 34, which converts the character code data to a pixel pattern map. For color prints, the mapper separates the information into four raster patterns, one for each color available at marking engine 12.

When the pixel pattern map is rasterized, mapper 34 sends page information to an output processor unit 36. The output processor unit has page memory 38, which stores image planes for transmission to the marking engine 12.

The processed image data arid signals identifying separate raster lines are transmitted along an image data bus 40 to multiplexer 18a. Signals representing coded messages that provide page information and other marking engine control information are transmitted along the job control communications link 26.

The marking engine 12 receives bit stream image data over a bus 44 and job control data over the communications link 26. The image data is stored in a job image buffer (JIB) which is a multiple page buffer memory 48 under the control of a memory management unit 50.

Control means, including a micro controller 52 having one or more microprocessors, is arranged to perform arithmetic and logic operations and instruction decoding for operation of the marking engine 12 as well as controlling the time allocation of peripherals (such as a paper supply controller 54 and accessories 56) through a machine control communications link 58. Several output functions may be available for receiver sheets, including selection of output trays, stapling, sorting, folding, finishing, mailbox, envelope receiver, etc. Programming of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

After appropriate processing, the data is input to a writer interface 60 and an LED writer 62 for forming images on receiver sheets.

According to FIG. 2, the LED, laser or other type of writer 62 of marking engine 12 includes an image bearing member, for example, either a drum or preferably an endless electrophotoconductive web 64 entrained about a series of primary rollers and other supporting structure. Web 64 is driven by a motor driven roller through a series of electrophotographic stations generally well known in the art. More specifically, a uniform charge is laid down on the web by a charging station 66. The uniformly charged web moves around one of the rollers, which is directly opposite an LED printhead 68 which LED printhead selectively image-wise exposes web 64 in a manner well known in the art to form an electrostatic latent image. The web then moves into operative relation with an electrometer 70 which senses the level of a charge existing after exposure of the web by printhead 68, to help control the process.

The web then moves into operative relation with a series of toning or developing stations 72, 73, 74 and 75. Each image created by printhead 68 is toned by one of the toning stations. After being toned, the web passes a magnetic scavenger 76 which removes excess iron particles picked up in the toning process. After the electrostatic image has been toned, the web passes under densitometer 78 which measures the density of the toner image also for use in controlling the process. The toner image then proceeds to a transfer station 80 where the image is transferred to a transfer surface of a receiver sheet carried by a transfer drum 82.

As thoroughly discussed in U.S. Pat. No. 4,712,906, consecutive images in different colors are transferred in registry to a receiver sheet. The receiver sheet is wrapped on transfer drum 82 and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum. Since the short dimension of letter size sheets is approximately half the long dimension of ledger size sheets, two letter size sheets are placed on the drum in approximately the same space as the single ledger size sheet. When the apparatus is operating in a multi-image mode, for example, a multi-color mode, consecutive images or pairs of images are toned with different colored toners using the different toning stations 72–75. These consecutive images are transferred in register to the receiver sheet as it repeatedly is brought into transfer relation with web 64 by drum 82. After the transfer operation is complete, the receiver sheet is allowed to follow the web, for example, by removing the vacuum holding it to drum 82 or by stripping the sheet with a skive, or other conventional stripping mechanism or both. The receiver sheet is separated from the web with the aid of an electrostatic sheet transport mechanism 84 and is transported to a fuser 86. The web is then cleaned by the application of a neutralizing corona and a neutralizing erase lamp and a magnetic brush cleaning mechanism all located at a cleaning station 88.

After the receiver sheet leaves fuser 86 it can go directly to an output tray 90 or be deflected by a deflector 92 into a duplex path according to the position of deflector 92, the position of which is controlled by the logic of the apparatus through means not shown. The duplex path moves the sheet by rollers and guides directing it first through a passive deflector 94 into turn-around rollers 96. Turn-around rollers 96 are independently driven to drive the receiver sheet into turn-around guide means 98, until the trailing edge thereof has been sensed by an appropriate sensor, not shown, to have passed passive deflector 94. Once the trailing edge has passed passive deflector 94, turn-around rollers 96 are reversed and the receiver sheet is driven by rollers 96 and other sets of drive rollers 99, 100, and 101 back to a position upstream of transfer station 80. The receiver sheet can pass through registration mechanism for correcting for skew, cross track misalignment and in-track misalignment and ultimately stop at timing rollers 102.

Transfer station 80 receives sheets from any of three sources. First, it can receive sheets of one particular size from a first supply 104, which first supply may include, for example, letter size sheets being fed with their short dimension parallel with the direction of feed. Second, it may receive sheets from a second supply, 106, which, for example, may include ledger size sheets with their long dimension parallel to the direction of movement. Third, the transfer station may receive sheets from the duplex path which may include either size sheet and would already contain a fused image on its upper side. The receiver sheets from whatever source, stop against timing rollers 102. In response to a signal from the logic and control of the apparatus, not shown, timing rollers 102 accelerate to drive the receiver sheet into the nip between the transfer drum 82 and the web as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to output tray 90 are in the correct order considering the number of sheets that must be in the duplex path.

In operation of the copier mode, control logic package 27 starts in a sub-routine pre-programmed according to the switches on control panel 28 to command scanner 14 to begin operation. Automatic document handler 20 is activated to move seriatim document sheets into an exposure station of image scanner 22.

As the scanning of the document sheets progresses, data (including image information and control signals) are received by job image buffer 48. As subsequent original document sheets are scanned, the processes described above are repeated until all of the original document sheets have been scanned and the data therefrom stored in job image buffer 48.

One function of a multiple-page image buffer 48 is to store all the pages of a particular job so that plural sets of collated pages may be produced without re-scanning the set of originals for each set produced. Thus, data for each page in a copy set to be printed is sent to the writer interface 60 and, after the copy set is printed, data for each page in a second copy set is sent to the writer interface. Thus collated copy sets can be printed even without use of a sorter. As such, automatic document handler 20 need not be capable of recirculating the originals.

In a standard "copying" mode of operation, the latent images imaged by the LED printhead are aligned on web 64 such as to allow an orderly repetitive process of exposure and transfer to receiver sheets. Documents are sequentially imaged onto the photoconductive surface with consistent reference to frame marks on the web.

Figure 3:
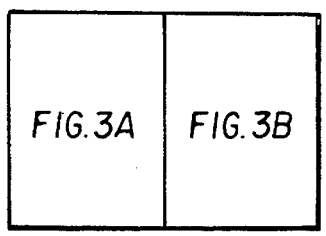
FIGS. 3, 3A, and 3B show a flowchart illustrating operation of the copier/printer apparatus in accordance with the invention.
Figure 3A:
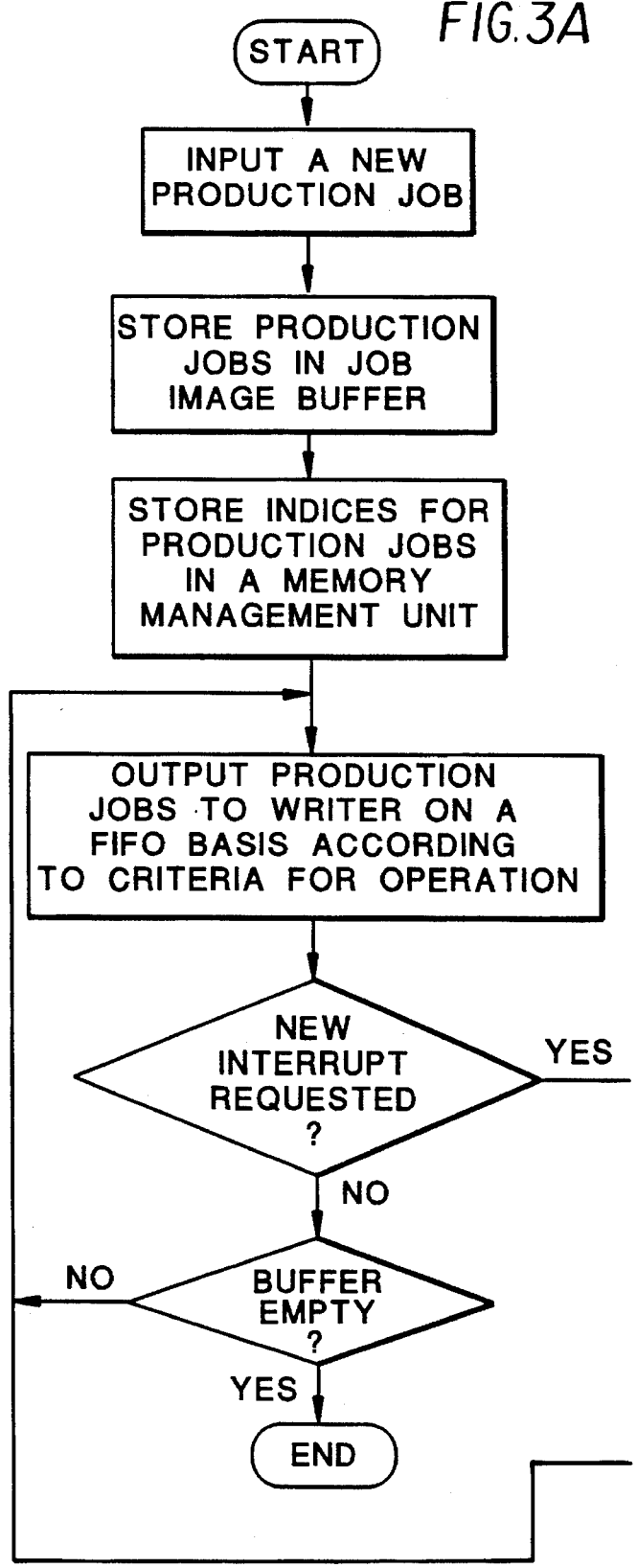
Figure 3B:
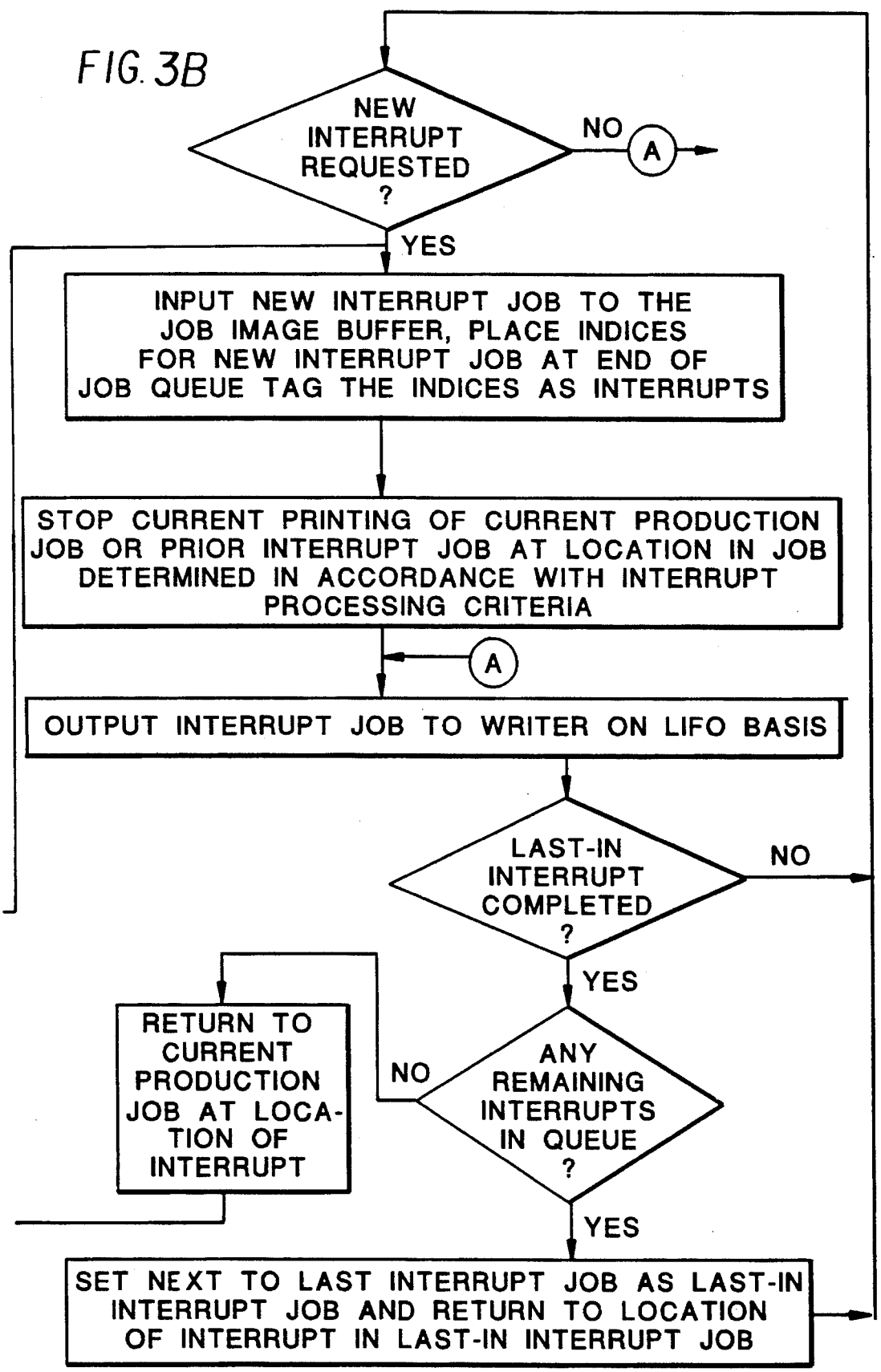

With reference now also to the flowchart of FIGS. 3, 3A and 3B, new production jobs are input to the copier/printer either as a copy job, wherein the scanner is used to input the data to be printed by the marking engine, or as a print job where electronic print jobs are input via a computer through input to the copier/printer's raster image processor. The apparatus may be operated in a copier-only mode wherein printer jobs are locked out or in a printer-only mode wherein copier jobs are locked out. However, in a copier/printer mode of operation, print jobs are sent to the JIB 48, one job at a time to allow room in the JIB memory for copy jobs that may be input. Copy jobs may be input as normal production jobs wherein plural jobs are stored and they are output to the writer on a FIFO basis after completion of a print job currently being printed. A display associated with the operator control panel (OCP) includes one or more soft keys allowing an operator to set up parameters for a next copy job while a current copy job or print job is printing and to allow the next job to be scanned in. The soft key may be identified as "next job setup" for setup during production of a current copy job and "copy job setup" during production of a current print job. The OCP also includes a soft key allowing an operator, upon actuation of the key, to set up parameters for an interrupt job and to allow for scanning of an interrupt job, if this job requires scanning, while the current production job is printing. Alternatively, actuation of the soft key by the operator generates a signal instructing the marking engine to stop in accordance with criteria for interrupt processing and setup of the interrupt job can be entered after the marking engine stops printing the interrupted current production job. Assuming the mode of operation is the copier/printer mode, the normal production jobs stored in the JIB are copy jobs and one print job.

The copy jobs carry priority and indices; identifying the location of these jobs are stored in a job image file queue in the memory management unit 50. Copy jobs are then output to a writer on a FIFO basis. When the normal copy jobs are completed, the print job then residing in the JIB gets printed. Alternatively, the copy jobs may await completion of a print job before plural copy jobs are printed on a FIFO basis.

When an interrupt is requested via soft key on the OCP or through other means, the new interrupt job is placed into the job image buffer and indices for the new interrupt job are placed at the end of the job queue and these indices are tagged as interrupts. When all image data for the interrupt job is captured in the JIB, making the new interrupt ready to be sent to the writer, printing of the current production job or prior interrupt job is stopped at a location in the job determined in accordance with interrupt processing criteria. Interrupt jobs are now output to the writer on a last-in, first-out (LIFO) basis until all the interrupts are completed.

Any new interrupts are input to the job queue at the end as described above. When no interrupts reside in the queue the processing of the current production job, that was interrupted, at the location of the interrupt (or in any event back to where the interrupt occurred) and processing of the jobs currently residing in the queue resumes in FIFO operation until the buffer is empty or a new interrupt is requested.

As used herein "normal" production jobs includes typical jobs that customers run from a copier such as simplex, duplex, collated, etc. These include transmission of images from the scanner or RIP to the marking engines. In addition to the typical jobs other jobs that can be queued in FIFO are permanently stored forms located within the JIB, diagnostic images input from the scanner or RIP to the marking engines to be used solely for determining the health of the image hardware linking the scanner or RIP, requests for prints of billing data (either current or last transmitted) stored in nonvolatile form in the marking engine internal copy controller accound data that is sent from the scanner over the serial communications channel such as link 26 in ASCII form to the marking engine and convened to image data to be printed out.

Interrupt mode jobs may be a request for a sample print. A request via a hard or soft key on the OCP for a sample print creates an interrupt mode job request to the marking engine that a duplicate of the page of the job currently being sequenced is to be written to the film belt or web. A copy of the printed page is delivered to the proof exit and is intended for use by an operator to monitor the image quality of the machine without halting machine operation. Note "normal" production jobs may be typically sent to a different exit than that of the proof page. Interrupt jobs other than proof or sample may also be sent to said different exit. Another form of interrupt is a request for proof page. While setting up the parameters for a copying job, the operator, via a key on the OCP, may request a proof page. A signal representing this request is transmitted to the marking engine which automatically creates an interrupt job with default settings for the job level features; uses the page and image information already sent down as part of the original job, and delivers the page to the proof tray. This feature may be used by the operator to verify that the page editing is proper. The interrupt job is then automatically deleted although the page and image information remain with the original job. The requests for a sample print and proof page each represents an interrupt job that is a sub-set of another job that may itself be an interrupt job.

The interrupt capability comes in three fashions. A job is allowed to interrupt another job immediately which is approximately after the next sheet is fed from the paper supply; at the end of the set in process; or at the end of the job in process which in essence is inserting a job between two existing queued jobs. When a job is tagged as an interrupt job, the queueing of jobs switches from FIFO to Last-In-First-Out (LIFO) in order to process the interrupt job as soon as prescribed. Another job may interrupt the first interrupt job still adhering to the LIFO operation making it the active job as soon as prescribed. When this second interrupt job is completed, the first interrupt job resumes. When the first interrupt job is completed, the job that was interrupted resumes. The original job that was interrupted may have been the first-out job of a FIFO job queue. Interrupting an interrupt is thus now possible in an electronic copier and/or printer. The limiting factor is the maximum number of jobs that memory space has been allocated for on power-up of the machine. There thus may be supported interrupting a "normal" job, interrupting a queue of "normal" jobs, proofing a page, and proofing a page within an interrupt job (2 levels of interrupt). With the machine configured as a copier/printer, the machine thus supports interrupting a print job with a copy job, interrupting a copy job that interrupted a print job (2 levels of interrupt) and proofing a page within a job that interrupted a copy job that interrupted a print job (3 levels of interrupt).

Thus, it has been shown that by nesting of plural interrupts and processing the interrupts in LIFO while "normal" reproduction jobs are processed in FIFO provides certain unexpected advantages. The advantages are that interrupts of interrupts are very easily accomplished from a software consideration and particularly providing a sample or a proof print or other sub-set interrupt of an interrupt job is facilitated since by designating this job in the job queue as a last arriving job in a LIFO queue, it is handled easily in a LIFO processing scheme for printing.

The invention has been described in detail with particular reference to preferred embodiments thereof and illustrative examples, but it will be understood that variations and modifications can be effected within the spirit and scope of the invention.

I claim:

1. A reproduction apparatus, said apparatus comprising:

memory means for storing a plurality of production jobs for printing;

interrupt means for designating a plurality of production jobs to be stored in said memory means as interrupt jobs;

control means for controlling printing of normal production jobs in a first-in-first-out basis and for controlling printing of jobs designated as interrupt jobs so as to be printed on a last-in-first-out basis wherein a first interrupt job interrupts a current normal job and a second interrupt job interrupts the first interrupt job; and printing means responsive to the control means for forming prints of the plurality of normal production jobs and the interrupt jobs whereby later in time interrupt jobs interrupt earlier in time interrupt jobs and a first later-in-time interrupt job interrupts an earlier-in-time "normal" production job.

2. The apparatus of claim 1 and including means for requesting a sample page of a page in one interrupt job; and said control means, in response to a request for a sample page, creates a second interrupt job for said request and outputs a copy as a sample page of a page in the one interrupt job before completing the said one interrupt job.

3. The apparatus of claim 1 and including means for requesting a proof page of a page in one interrupt job; and said control means, in response to a request for a proof page, creates a second interrupt job for said request and outputs a copy as a proof page of a page in the one interrupt job before the one interrupt job begins being printed.

4. The apparatus of claim 1 and including means for requesting a subset interrupt job of one interrupt job; and in response to a request for a subset interrupt job, said control means creates an interrupt job and completes said subset job before completing said one job.

5. The apparatus of claim 1 and wherein production jobs are copy jobs.

6. The apparatus of claim 5 and including scanner means for scanning document originals to form electronic signals representing image information on the originals as copy jobs as production jobs.

7. The apparatus of claim 6 and including raster image processing means for processing electronic originals to generate print jobs as production jobs.

8. A method for electronically producing copies, said method comprising:

storing in a memory a plurality of production jobs for printing;

designating a plurality of production jobs stored in said memory as interrupt jobs; and controlling printing of normal production jobs in a first-in-first-out basis and controlling printing of jobs designated as interrupt jobs so as to be printed on a last-in-first-out basis wherein a first interrupt job interrupts a current normal job and a second interrupt job interrupts the first interrupt job; and forming prints of the plurality of normal production jobs and the interrupt jobs whereby later in time interrupt jobs interrupt earlier in time interrupt jobs and a first later-in-time interrupt job interrupts an earlier-in-time "normal" production job.

9. The method of claim 8 and including requesting a sample page of a page in one interrupt job; and in response to a request for a sample page, creating a second interrupt job for said request and outputting a copy as a sample page of a page in the one interrupt job before completing the said one interrupt job.

10. The method of claim 8 and including requesting a proof page of a page in one interrupt job; and in response to a request for a proof page, creating a second interrupt job for said request and outputting a copy as a proof page of a page in the one interrupt job before the one interrupt job begins being printed.

11. The method of claim 8 and including requesting a subset interrupt job of one interrupt job; and in response to a request for a subset interrupt job, said control means creates an interrupt job and completes said subset job before completing said one job.

12. The method of claim 8 and wherein production jobs are copy jobs.

13. The method of claim 12 and including scanning document originals to form electronic signals representing image information on the originals as copy jobs as production jobs.

14. The method of claim 13 and including processing electronic originals to generate print jobs as production jobs.

15. The method of claim 14 and wherein a copy job interrupts a print job.

16. The method of claim 15 and including generating a sample page as an interrupt of the copy job.

* * * * *